(12) United States Patent
Jiang

(10) Patent No.: US 9,002,269 B2
(45) Date of Patent: Apr. 7, 2015

(54) METHODS FOR A RADIO-FREQUENCY SIM CARD WITH LOW-FREQUENCY MAGNETIC COMMUNICATION TO TRIGGER A TRANSACTION ACCORDING TO DETERMINED DISTANCE THRESHOLDS

(75) Inventor: Yu Jiang, Shenzhen (CN)

(73) Assignee: Nationz Technologies Inc., Shenzhen (CN)

(*) Notice: Subject to any disclaimer, the term of this patent is extended or adjusted under 35 U.S.C. 154(b) by 373 days.

(21) Appl. No.: 13/638,252

(22) PCT Filed: Apr. 16, 2010

(86) PCT No.: PCT/CN2010/071822
§ 371 (c)(1),
(2), (4) Date: Sep. 28, 2012

(87) PCT Pub. No.: WO2011/120242
PCT Pub. Date: Oct. 6, 2011

(65) Prior Publication Data
US 2013/0017785 A1 Jan. 17, 2013

(30) Foreign Application Priority Data
Apr. 2, 2010 (CN) .......................... 2010 1 01387941

(51) Int. Cl.
*H04B 5/00* (2006.01)
*G06K 7/10* (2006.01)
(52) U.S. Cl.
CPC .................................. *G06K 7/10128* (2013.01)
(58) Field of Classification Search
USPC ....................................... 455/41.1, 422, 552.1
See application file for complete search history.

(56) References Cited

U.S. PATENT DOCUMENTS

| | | | |
|---|---|---|---|
| 2002/0187779 A1* | 12/2002 | Freeny, Jr. ...................... | 455/422 |
| 2006/0219776 A1* | 10/2006 | Finn .............................. | 235/380 |
| 2009/0047992 A1* | 2/2009 | Ortiz et al. .................. | 455/552.1 |
| 2009/0137204 A1* | 5/2009 | Chang .......................... | 455/41.1 |

FOREIGN PATENT DOCUMENTS

CN 101329717 A 12/2008

OTHER PUBLICATIONS

Written Opinion of the International Searching Authority dated (mailed) Dec. 30, 2010; issued in related Application No. PCT/CN2010/071822 for Nationz Technologies, Inc., et al. (3 pgs.).

* cited by examiner

*Primary Examiner* — Wesley Kim
*Assistant Examiner* — Raj Chakraborty
(74) *Attorney, Agent, or Firm* — Finnegan, Henderson, Farabow, Garrett & Dunner LLP

(57) ABSTRACT

A method for a radio-frequency SIM card with low-frequency magnetic communication to trigger a transaction according to determined distance thresholds comprises: setting a Threshold 1 as a low-frequency magnetic field intensity value corresponding to a distance to trigger the transaction; setting a Threshold 2 as a low-frequency magnetic field intensity value corresponding to an effective communication distance of the low-frequency magnetic field; setting a Threshold 3 as a low-frequency magnetic field intensity value corresponding to a farthest transaction distance; examining an intensity of the low-frequency magnetic field transmitted by a card reader and determining whether the intensity is >=the Threshold 2; if yes, receiving and storing information of the low-frequency magnetic field; further determining whether a low-frequency magnetic field intensity is >=the Threshold 1; if yes, initiating a transaction process; during the transaction process, determining whether a low-frequency magnetic field intensity is < the Threshold 3; if yes, interrupting the transaction.

7 Claims, 4 Drawing Sheets

| Distance between mobile communication terminal and card reader (cm) | Magnetic field intensity (dBmV) |
|---|---|
| 1cm | 52 |
| 2cm | 47 |
| 3cm | 40 |
| 4cm | 36 |
| 5cm | 30 |
| 6cm | 26 |
| 7cm | 21 |
| 8cm | 17 |
| 9cm | 11 |
| 10cm | 8 |
| 14cm | 5 |

METHODS FOR A RADIO-FREQUENCY SIM CARD WITH LOW-FREQUENCY MAGNETIC COMMUNICATION TO TRIGGER A TRANSACTION ACCORDING TO DETERMINED DISTANCE THRESHOLDS

TECHNICAL FIELD

This invention relates to the communication field, especially to a method for a radio-frequency SIM card with low-frequency magnetic communication to initiate or trigger a transaction according to determined distance thresholds.

TECHNICAL BACKGROUND

Along with the popularization of the mobile communication technology, mobile communication terminals gradually come into people's daily lives. As an important part of mobile communication terminals, the SIM (Subscriber Identity Model) card in the mobile communication terminals is broadly used. Along with the continuous development of the technology, to meet the increasing requirements of users' experiences on mobile communication terminals, a SIM card with multiple new functions is developed and is put into use. A radio-frequency SIM card with low-frequency magnetic communication is one of the examples.

The radio-frequency SIM card with low-frequency magnetic communication is a SIM card with functions of low-frequency magnetic communication and radio-frequency communication. It comprises a card body and an integrated circuit in the card body. The card body of the radio-frequency SIM card with low-frequency magnetic communication comprises a SIM card interface that matches with a mobile communication terminal. The integrated circuit in the card body comprises: a central processing unit (CPU); a low-frequency magnetic induction circuit and a low-frequency magnetic information receiving module that are electrically connected with the CPU; a SIM card memory, a radio-frequency transceiver circuit, and an interface circuit that are electrically connected with the CPU; and a radio-frequency transceiver antenna electrically connected with the radio-frequency transceiver circuit. The radio-frequency SIM card with low-frequency magnetic communication is electrically connected, through its own interface circuit and the SIM card interface on the card body, with a mobile communication terminal. The radio-frequency SIM card with low-frequency magnetic communication not only can communicate with the mobile communication terminal to realize functions of a normal SIM card but also can conduct short-distance communication with matching external processing devices (e.g. a card reader) through the low-frequency magnetic induction circuit, the low-frequency magnetic information receiving module, the radio-frequency transceiver circuit, and the interface circuit. The process and content of the short-distance communication is processed specifically by the central processing unit CPU inside the radio-frequency SIM card with low-frequency magnetic communication.

The radio-frequency SIM card with low-frequency magnetic communication is mostly used in a mobile phone. Besides all the functions of a normal SIM card, it can also allow the mobile phone to have the functions of smart cards such as a public transit card, an entrance guard communication card, a credit card, a small-amount payment card, and a time card. Moreover, the information generated when the various smart card functions are used can be displayed directly on a screen of the mobile phone and the user can accomplish the various operations through a keyboard of the mobile phone.

When a radio-frequency SIM card with low-frequency magnetic communication is used as smart cards such as a public transit card, an entrance guard communication card, a credit card, a small-amount payment card, and a time card, to avoid misreading operations, a distance for a mobile communication terminal having the radio-frequency SIM card with low-frequency magnetic communication to carry out an effective data transmission with a card reader, i.e. a transaction-triggering distance, must be controlled to a certain range. In addition, when the SIM card enters such a transaction zone, the transaction-triggering speed shall not be too slow; otherwise, the use effect of the user will be affected.

It is a fact that a radio-frequency SIM card with low-frequency magnetic communication needs a long time to receive information of the low-frequency magnetic field during the use resulting from a low communication rate of a low-frequency alternating magnetic field. How to maximize the reliability of a transaction-triggering distance while overcoming the problem of an excessive long transaction-triggering time caused by such fact is important and urgent for realizing an application of a radio-frequency SIM card with low-frequency magnetic communication. Meanwhile, minimizing the user's transaction time is also important.

SUMMARY OF THE INVENTION

The technical problem to be resolved by this invention is to provide with a method for a radio-frequency SIM card with low-frequency magnetic communication to trigger or initiate a transaction according to determined distance thresholds. The method can reduce a transaction-triggering time of the radio-frequency SIM card with low-frequency magnetic communication while reducing the user's card swiping time and promoting the user's experiences.

To resolve the above described technical problem, this invention provides a method for a radio-frequency SIM card with low-frequency magnetic communication to trigger a transaction according to determined distance thresholds. The radio-frequency SIM card carries out a distance control of short-distance communication with a corresponding card reader through a low-frequency channel and conducts a transaction with the card reader through the radio-frequency channel. The method for a radio-frequency SIM card with low-frequency magnetic communication to trigger a transaction according to determined distance thresholds comprises:

Step a: setting a Threshold 1 as a low-frequency magnetic field intensity value corresponding to a distance to trigger a transaction; setting a Threshold 2 as a low-frequency magnetic field intensity value corresponding to an effective communication distance for the low-frequency magnetic field; setting a Threshold 3 as a low-frequency magnetic field intensity value corresponding to a farthest transaction distance; wherein the Threshold 1 is greater than or equal to (>=) the Threshold 3, and the Threshold 3 is greater than or equal to (>=) the Threshold 2.

Step b: continuously examining, by the radio-frequency SIM card, the intensity of a low-frequency magnetic field transmitted by a card reader; determining whether the intensity of the low-frequency magnetic field is greater than or equal to (>=) the Threshold 2; if yes, receiving and storing information of the low-frequency magnetic field.

Step c: further determining, by the radio-frequency SIM card, whether the intensity of the low-frequency magnetic field transmitted by the card reader is greater than or equal to (>=) the Threshold 1; if yes, initiating, by the radio-frequency SIM card, a transaction process.

Step d: during the transaction process, examining, by the radio-frequency SIM card, the intensity of the low-frequency magnetic field transmitted by the card reader; and determining whether the intensity is less than (<) the Threshold 3; if yes, interrupting the transaction.

Further, the above described method is also characterized in that, in the Step a, the steps for determining the Threshold 1, Threshold 2, and Threshold 3 are as follows:

A. Through experiments, measuring, using a radio-frequency SIM card, intensities of a low-frequency magnetic field transmitted by a card reader that matches with the radio-frequency SIM card, determining a correspondence relationship between the low-frequency magnetic field intensities and distances, and establishing a correspondence table between the low-frequency magnetic field intensities and the distances.

B. In reference to the correspondence table between the low-frequency magnetic field intensities and the distances and in accordance with requirements for a transaction-triggering distance, setting a low-frequency magnetic field intensity value corresponding to the transaction-triggering distance as the Threshold 1; in accordance with a communication rate of the low-frequency magnetic field and in combination with a data size or volume that a data transmission needs in the low-frequency magnetic field for the radio-frequency SIM card, calculating an effective communication distance of the low-frequency magnetic field, and setting a low-frequency magnetic field intensity value corresponding to the effective communication distance of the low-frequency magnetic field as the Threshold 2; in accordance with requirements for a farthest transaction distance control, setting a low-frequency magnetic field intensity value corresponding to the farthest transaction distance as the Threshold 3.

Also, the above described method is also characterized in that, in the Step b, if the low-frequency magnetic field intensity is less than (<) the Threshold 2, the radio-frequency SIM card stops receiving the information of the low-frequency magnetic field and continues examining the intensity of the low-frequency magnetic field transmitted by the card reader.

In addition, the above described method is also characterized in that, in the Step c, if the low-frequency magnetic field intensity is less than (<) the Threshold 1, then the radio-frequency SIM card executes Step b.

Moreover, the above described method is also characterized in that, in the Step d, during the transaction process, if the low-frequency magnetic field intensity is greater than (>) the Threshold 3, then the radio-frequency SIM card continues the transaction until the transaction completes.

Furthermore, the above described method is also characterized in that the low-frequency magnetic field is an alternating field and a frequency of the low-frequency magnetic field is in a range of 100 Hz~125 KHz.

Further, the above described method is also characterized in that a working frequency of the radio-frequency channel is in a super-high-frequency SHF frequency range, a very-high-frequency VHF frequency range, or an ultra-high-frequency UHF frequency range.

In addition, the above described method is also characterized in that a working frequency of the radio-frequency channel is 433 MHz, 2.4 GHz, or 5 GHz.

The method in accordance with this invention for a radio-frequency SIM card with low-frequency magnetic communication to initiate or trigger a transaction according to determined distance thresholds reduces the transaction-triggering time of the radio-frequency SIM card with low-frequency magnetic communication in a short-distance communication application, reduces the user's card swiping time and promotes the user's experiences.

DESCRIPTION OF THE EMBODIMENTS

The principles and features of this invention are described in combination with the attached drawings as follows. The examples are given only for illustrating this invention instead of limiting the scope of this invention.

First of all, a brief introduction is given to a radio-frequency SIM card and a card reader in accordance with disclosed embodiments of this invention. The radio-frequency SIM card in accordance with this invention is a radio-frequency SIM card with low-frequency magnetic communication as described above.

Figure 1:
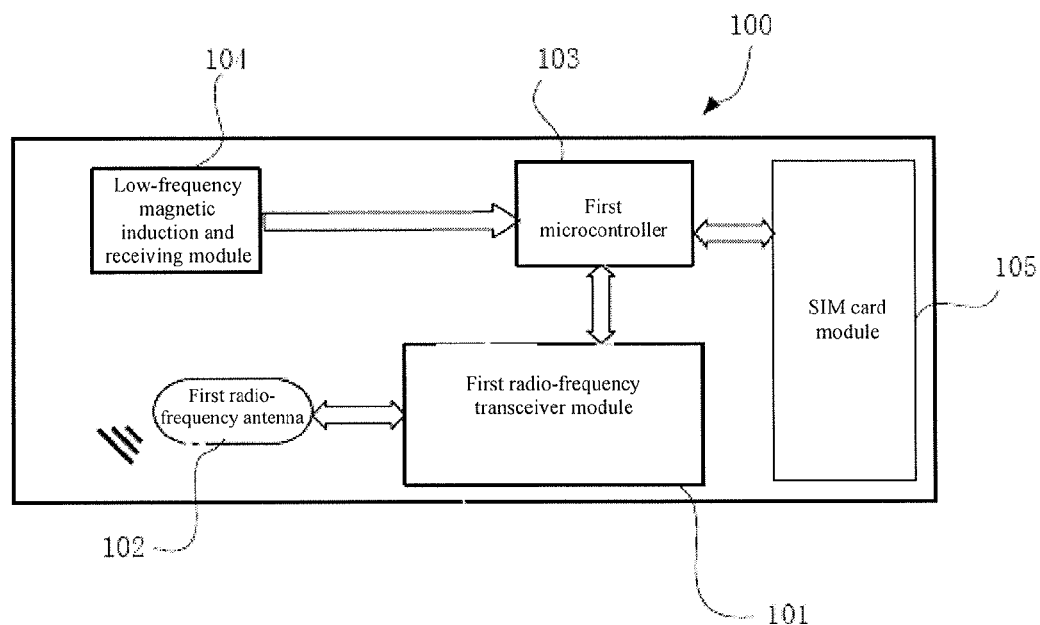
FIG. 1 is a structural diagram illustrating an exemplary radio-frequency SIM card in accordance with an embodiment of this invention.

FIG. 1 is a structural diagram illustrating an exemplary radio-frequency SIM card in accordance with an embodiment of this invention. As shown in FIG. 1, a radio-frequency SIM card with low-frequency magnetic communication 100 in accordance with an embodiment of this invention comprises a SIM card module (i.e. a SIM card body) 105, a first radio-frequency transceiver module 101, a first radio-frequency antenna 102, a first microcontroller 103, a low-frequency magnetic induction and receiving module 104. Among them, the first radio-frequency transceiver module 101 is electrically connected with the first radio-frequency antenna 102 and the first microcontroller 103, respectively. The low-frequency magnetic induction and receiving module 104 is electrically connected with the first microcontroller 103. And the SIM card module 105 is electrically connected with the first microcontroller 103.

Figure 2:
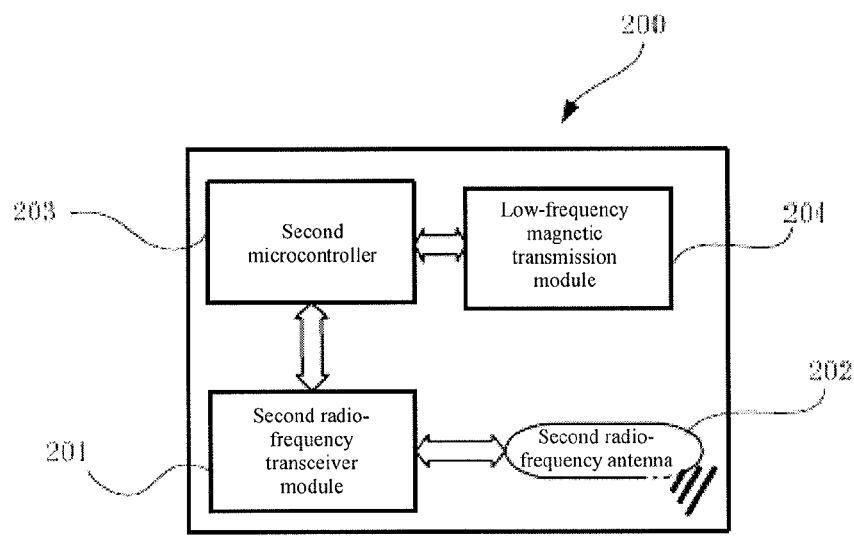
FIG. 2 is a structural diagram illustrating an exemplary card reader in accordance with an embodiment of this invention.

FIG. 2 is a structural diagram illustrating an exemplary card reader in accordance with an embodiment of this invention. As shown in FIG. 2, a card reader 200 is used in combination with the radio-frequency SIM card 100 shown in FIG. 1. The card reader 200 comprises a second radio-frequency transceiver module 201, a second radio-frequency antenna 202, a second microcontroller 203, and a low-frequency magnetic transmission module 204. Among them, the second radio-frequency transceiver module 201 is electrically connected with the second radio-frequency antenna 202 and the second microcontroller 203, respectively. The low-frequency magnetic transmission module 204 is used to generate a low-frequency induction magnetic field. The low-frequency magnetic transmission module 204 is electrically connected with the second microcontroller 203.

Figure 4:
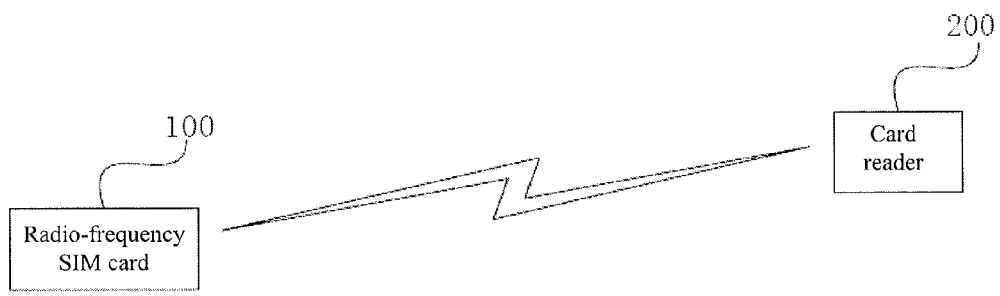
FIG. 4 is an exemplary application scene of a radio-frequency SIM card, in accordance with an embodiment of this invention.

FIG. 4 is an exemplary application scene of a radio-frequency SIM card, in accordance with an embodiment of this invention. As shown in FIG. 4, when a radio-frequency SIM card 100 approaches a card reader 200, a low-frequency magnetic induction and receiving module 104 in the radio-frequency SIM card 100 senses an adaptable low-frequency magnetic field signal generated by a low-frequency magnetic transmission module 204 (in the card reader 200). This low-frequency magnetic field signal is converted into an electrical signal and then sent to a first microcontroller 103 of the radio-frequency SIM card. The first microcontroller 103 will treat the signal accordingly based on a variation of a low-frequency magnetic field intensity so as to realize a communication distance control and an information transmission between the card reader 200 and the radio-frequency SIM card 100. Then the card reader 200 and the radio-frequency SIM card 100 realize a radio-frequency communication directly through a first radio-frequency transceiver module 101 (in the radio-frequency SIM card 100) and a second radio-frequency transceiver module 201 (in the card reader 200).

Figure 3:
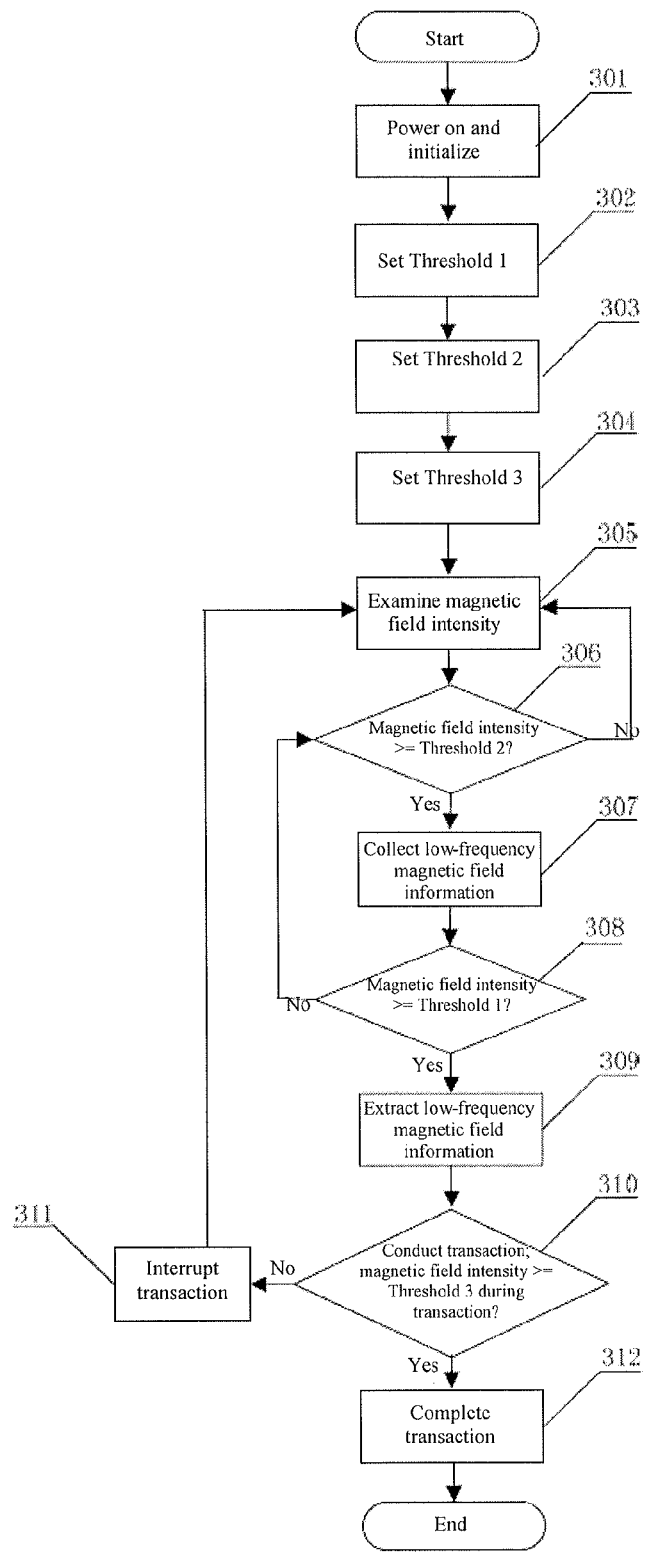
FIG. 3 is a flow chart illustrating an exemplary distance control process for a radio-frequency SIM card, in accordance with an embodiment of this invention.

FIG. 3 is a flow chart illustrating an exemplary distance control process for a radio-frequency SIM card, in accordance with an embodiment of this invention. As shown in FIG. 3, in this embodiment, an exemplary distance control process for a radio-frequency SIM card comprises:

Step 301: Start. The radio-frequency SIM card is powered on and initialized.

After having been powered on and initialized, the radio-frequency SIM card starts basic functions of a SIM card.

Step 302: Set Threshold 1. Threshold 1 is a low-frequency magnetic field intensity value corresponding to a transaction-triggering distance.

Step 303: Set Threshold 2. Threshold 2 is a low-frequency magnetic field intensity value corresponding to an effective communication distance of the low-frequency magnetic field.

Step 304: Set Threshold 3. Threshold 3 is a low-frequency magnetic field intensity value corresponding to a farthest transaction distance.

Figures 6, 7:
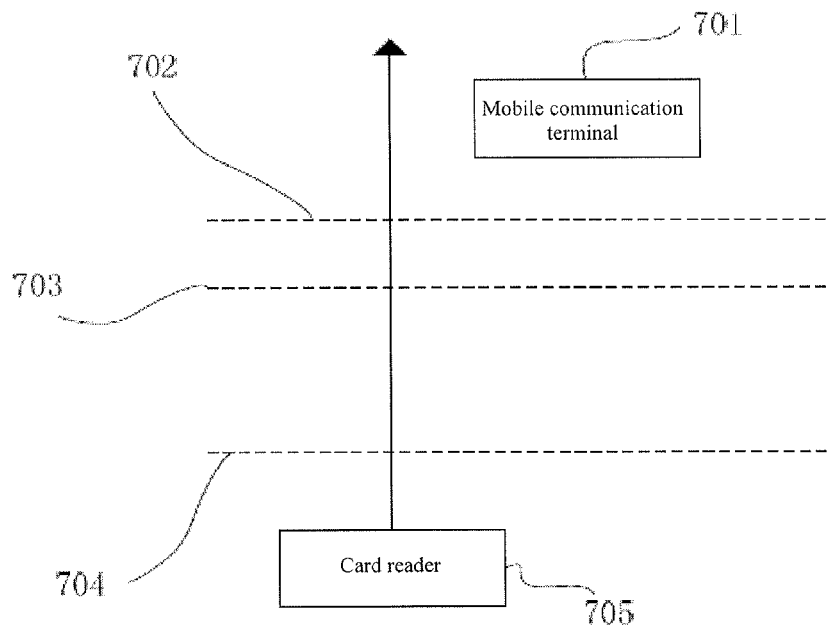
FIG. 6 illustrates an exemplary correspondence relationship table between low-frequency magnetic field intensities and distances in accordance with an embodiment of this invention.
FIG. 7 is a relative position diagram illustrating exemplary Threshold 1, Threshold 2, and Threshold 3 in accordance with an embodiment of this invention.

FIG. 7 is a relative position diagram illustrating exemplary Threshold 1, Threshold 2, and Threshold 3 in accordance with an embodiment of this invention. The relative positions of Threshold 1 (704), Threshold 2 (702), and Threshold 3 (703) are as shown in FIG. 7. A mobile communication terminal 701 equipped with a radio-frequency SIM card approaches a card reader 705 from far to near. When the mobile communication terminal 701 enters Threshold 2 (702), the receiving of low-frequency magnetic information is carried out. When the mobile communication terminal 701 enters Threshold 1 (704), a card swiping transaction is carried out. When the mobile communication terminal 701 leaves Threshold 3 (703), the transaction is finished. Threshold 1 is greater than or equal to (>=) Threshold 3, and Threshold 3 is greater than or equal to (>=) Threshold 2.

In this embodiment, Threshold 1, Threshold 2, and Threshold 3 can be determined through Step A and Step B described as follows:

A. Through experiments, using a radio-frequency SIM card to measure intensities of a low-frequency magnetic field transmitted by a card reader that matches with the radio-frequency SIM card, determining a correspondence relationship between the low-frequency magnetic field intensities and distances, and establishing a correspondence table between the low-frequency magnetic field intensities and the distances.

Figure 5:
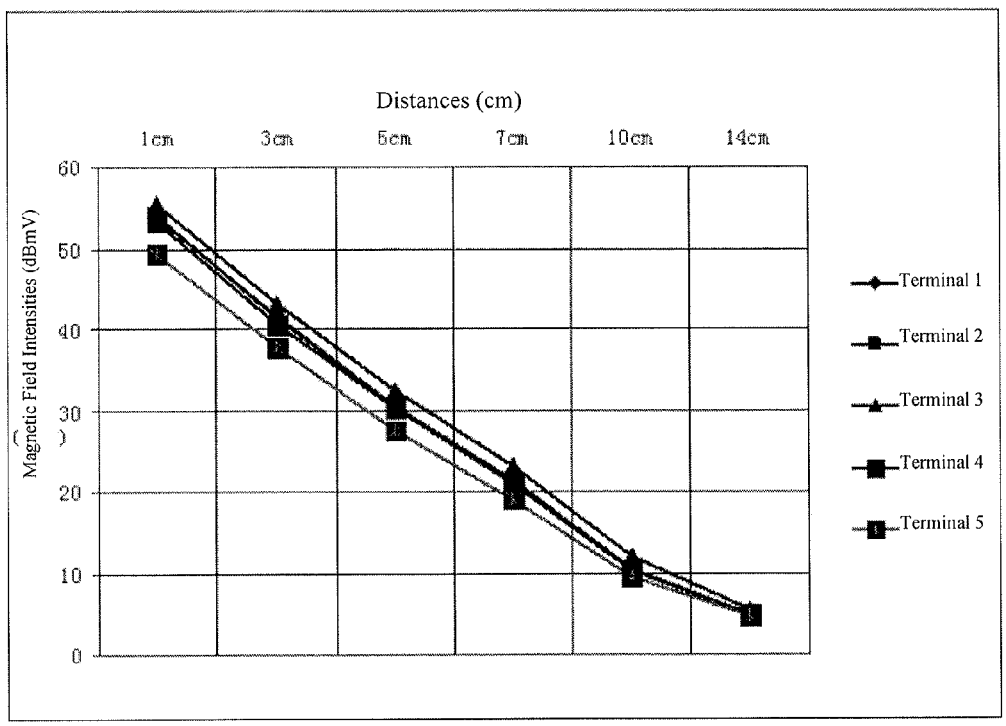
FIG. 5 illustrates exemplary correspondence relationship curves, which are obtained through experiments, between different mobile communication terminal distances and different low-frequency magnetic field intensities, in accordance with an embodiment of this invention.

Exemplary correspondence relationship curves, which are obtained through experiments, between different mobile communication terminal distances and different low-frequency magnetic field intensities in accordance with an embodiment of this invention is as shown in FIG. 5. An exemplary correspondence relationship table between low-frequency magnetic field intensities and distances in accordance with an embodiment of this invention is as shown in FIG. 6.

B. In reference to the correspondence table between the low-frequency magnetic field intensities and the distances and in accordance with requirements for a transaction-triggering distance, setting a low-frequency magnetic field intensity value corresponding to the transaction-triggering distance as Threshold 1; in accordance with a communication rate of the low-frequency magnetic field and in combination with a data size or volume that a data transmission needs in the low-frequency magnetic field for the radio-frequency SIM card, calculating an effective communication distance of the low-frequency magnetic field, and setting a low-frequency magnetic field intensity value corresponding to the effective communication distance of the low-frequency magnetic field as Threshold 2; in accordance with requirements for a farthest transaction distance control, set a low-frequency magnetic field intensity value corresponding to the farthest transaction distance as Threshold 3. Threshold 1 is greater than or equal to (>=) Threshold 3, and Threshold 3 is greater than or equal to (>=) Threshold 2.

Step B can be divided into the following three sub-steps:

B1. In accordance with requirements for a transaction-triggering distance and in reference to a correspondence table between low-frequency magnetic field intensities and distances, determine a value of a low-frequency magnetic field intensity corresponding to the transaction-triggering distance as Threshold 1.

B2. In accordance with a communication rate of the low-frequency magnetic field and in combination with a data size or volume that a data transmission needs in the low-frequency magnetic field for the radio-frequency SIM card, calculating an effective communication distance of the low-frequency magnetic field; and, in reference to the correspondence table between low-frequency magnetic field intensities and distances, determining a low-frequency magnetic field intensity value corresponding to the effective communication distance of the low-frequency magnetic field as Threshold 2.

B3. In accordance with requirements for a farthest transaction distance control, setting a low-frequency magnetic field intensity value corresponding to the farthest transaction distance as Threshold 3.

Now referring back to FIG. 3, Step 305: The radio-frequency SIM card examines the intensity of a low-frequency magnetic field transmitted by the card reader.

The radio-frequency SIM card turns on a low-frequency magnetic field detection function while turning off a radio-frequency function and a magnetic information receiving function.

Step 306: The radio-frequency SIM card determines whether the low-frequency magnetic field intensity is greater than or equal to (>=) Threshold 2. If yes, the radio-frequency SIM card executes Step 307; otherwise, it executes Step 305.

Step 307: The radio-frequency SIM card collects low-frequency magnetic field information.

Only when the low-frequency magnetic field intensity is greater than or equal to (>=) Threshold 2, the radio-frequency SIM card turns on the low-frequency magnetic field information receiving function and starts receiving the low-frequency magnetic field information while continuing the examination of the low-frequency magnetic field intensity.

Step 308: The radio-frequency SIM card determines whether the low-frequency magnetic field intensity is greater than or equal to (>=) Threshold 1. If yes, the radio-frequency SIM card executes Step 309; otherwise, it executes Step 306.

After the radio-frequency SIM card starts receiving the low-frequency magnetic field information, if the low-frequency magnetic field intensity is less than Threshold 2, the radio-frequency SIM card turns off the low-frequency magnetic field information receiving function while continuing examining whether the low-frequency magnetic field intensity is greater than or equal to (>=) Threshold 2. If the low-frequency magnetic field intensity is greater than (>) Threshold 1, the low-frequency SIM card extracts the received low-frequency magnetic field information data, starts the radio-frequency function, and prepares for conducting a transaction.

Step 310: Conduct the transaction. During the transaction, the radio-frequency SIM card determines whether the low-frequency magnetic field intensity is greater than or equal to (>=) Threshold 3. If yes, the radio-frequency SIM card executes Step 312; otherwise, it executes Step 311.

Step 311: Interrupt the transaction.

Step 312: The radio-frequency SIM card completes the transaction and then ends.

Using the extracted low-frequency magnetic field information, the radio-frequency SIM card accomplishes smart-card-related applications of a radio-frequency SIM card through a radio-frequency function.

The above descriptions show that in accordance with disclosed embodies of this invention, a method uses a radio-frequency SIM card with low-frequency magnetic communication to trigger a transaction according to determined distance thresholds. While using the feature that a low-frequency magnetic field is less influenced by a shielding effect to control a transaction-triggering distance of a radio-frequency SIM card, the method overcomes a problem of excessive long transaction-triggering time caused by the fact that a radio-frequency SIM card needs a long time to receive a low-frequency magnetic field during a use. While effectively avoiding card misreading phenomena, the method, within the extent allowed by a distance control, reduces customers' card swiping time within a transaction-triggering distance and promotes the quality of users' experiences.

The above descriptions are just some exemplary embodiments of this invention and are not intended to limit this invention. Any modifications, equivalent substitutions, and improvements made within the spirit and principle of this invention shall be included in the protection scope of this invention.

What is claimed is:

1. A method for a radio-frequency Subscriber Identity Module (SIM) card with low-frequency magnetic communication to trigger a transaction according to determined distance thresholds, wherein the radio-frequency SIM card carries out a distance control of a short-distance communication with a corresponding card reader through a low-frequency channel and conducts the transaction with the card reader through the radio-frequency channel, the method comprising:

Step a: setting a Threshold 1 as a low-frequency magnetic field intensity value corresponding to a distance to trigger the transaction; setting a Threshold 2 as a low-frequency magnetic field intensity value corresponding to an effective communication distance of the low-frequency magnetic field; and setting a Threshold 3 as a low-frequency magnetic field intensity value corresponding to a farthest transaction distance; wherein the Threshold 1 is greater than or equal to the Threshold 3, and the Threshold 3 is greater than or equal to the Threshold 2;

Step b: examining continuously, by the radio-frequency SIM card, an intensity of the low-frequency magnetic field transmitted by the card reader; determining whether the intensity is greater than or equal to the Threshold 2; and upon determining that the intensity is greater than or equal to the Threshold 2, receiving and storing information of the low-frequency magnetic field;

Step c: further determining, by the radio-frequency SIM card, whether an intensity of the low-frequency magnetic field transmitted by the card reader is greater than or equal to the Threshold 1; and upon determining that the intensity is greater than or equal to the Threshold 1, initiating, by the radio-frequency SIM card, a transaction process;

Step d: during the transaction process, examining, by the radio-frequency SIM card, an intensity of the low-frequency magnetic field transmitted by the card reader; determining whether the intensity is less than the Threshold 3; and upon determining that the intensity is less than the Threshold 3, interrupting the transaction; and wherein in the Step a, the steps for determining the Threshold 1, the Threshold 2, and the Threshold 3 are as follows:

A. through experiments, measuring, using a radio-frequency SIM card, intensities of a low-frequency magnetic field transmitted by a card reader that matches with the radio-frequency SIM card; determining a correspondence relationship between the intensities and distances; and establishing a correspondence table between the intensities and the distances; and B. based on the correspondence table and requirements for a transaction-triggering distance, setting a low-frequency magnetic field intensity value corresponding to the transaction-triggering distance as the Threshold 1; based on a communication rate of the low-frequency magnetic field and a data size that a data transmission needs in the low-frequency magnetic field for the radio-frequency SIM card, calculating an effective communication distance of the low-frequency magnetic field and setting a low-frequency magnetic field intensity value corresponding to the effective communication distance as the Threshold 2; based on requirements for a farthest transaction distance control, setting a low-frequency magnetic field intensity value corresponding to the farthest transaction distance as the Threshold 3.

2. The method of claim 1, wherein in the Step b, upon determining that the low-frequency magnetic field intensity is less than the Threshold 2, stopping, on the radio-frequency SIM card, receiving the information of the low-frequency magnetic field; and continuing examining the intensity of the low-frequency magnetic field transmitted by the card reader.

3. The method of claim 1, wherein in the Step c, upon determining that the low-frequency magnetic field intensity is less than the Threshold 1, executing Step b.

4. The method of claim 1, wherein in the Step d, during the transaction process, upon determining that the low-frequency magnetic field intensity is greater than the Threshold 3, continuing the transaction until the transaction completes.

5. The method of claim 1, wherein the low-frequency magnetic field is an alternating field and a frequency of the low-frequency magnetic field is in a range of 100 Hz~125 KHz.

6. The method of claim 1, wherein a working frequency of the radio-frequency channel is in a super-high-frequency SHF frequency range, a very-high-frequency VHF frequency range, or an ultra-high-frequency UHF frequency range.

7. The method of claim 1, wherein a working frequency of the radio-frequency channel is 433 MHz, 2.4 GHz, or 5 GHz.

\* \* \* \* \*